Oct. 7, 1952 J. D. HARSH 2,612,890
HOT-AIR HEATING FURNACE
Filed Nov. 23, 1948
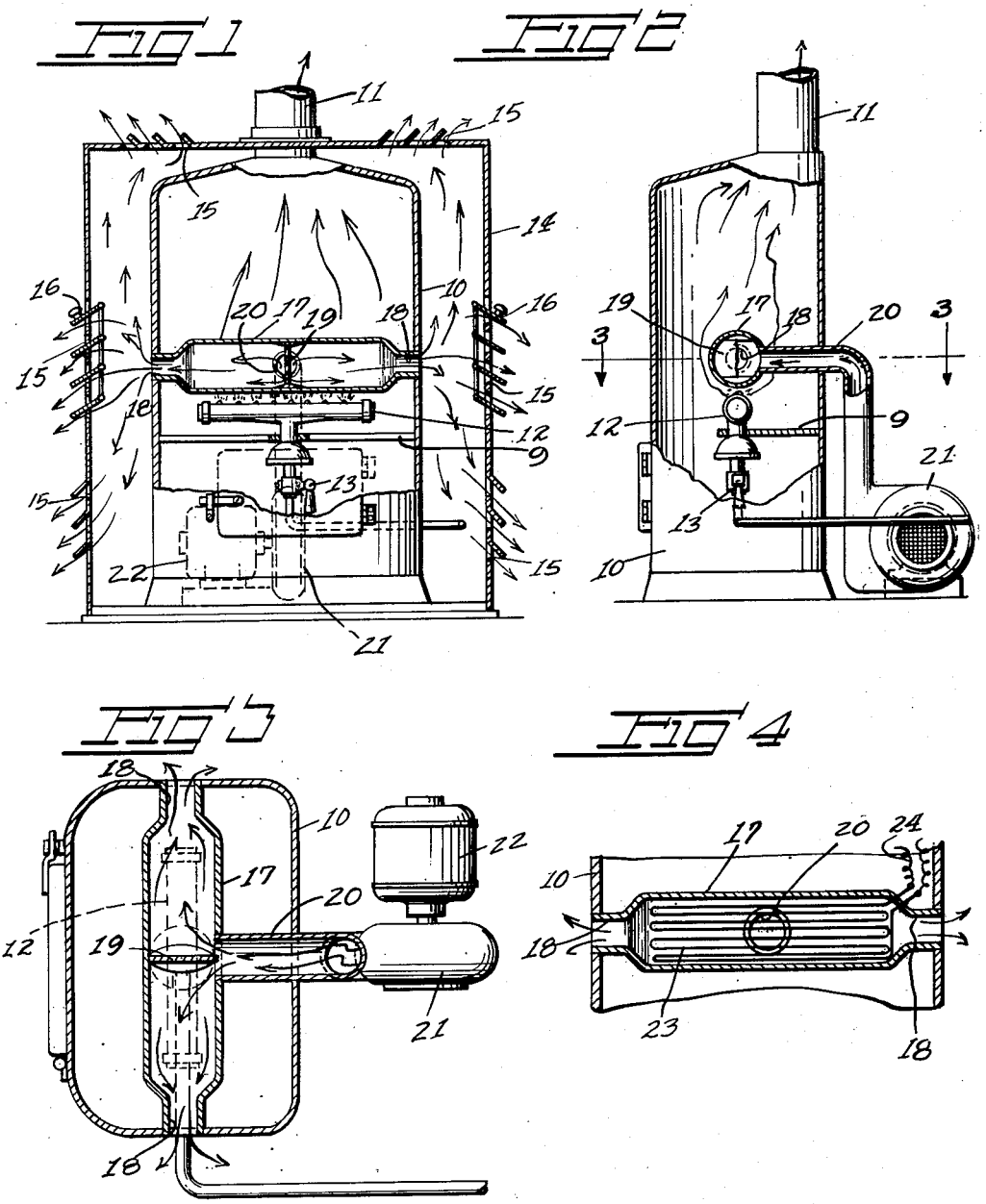
INVENTOR.
Joseph Delbert Harsh
BY
Wilfred E. Lawson
Attorney Patented Oct. 7, 1952

2,612,890

UNITED STATES PATENT OFFICE 2,612,890

HOT-AIR HEATING FURNACE

Joseph Delbert Harsh, Adel, Iowa

Application November 23, 1948, Serial No. 61,610

1 Claim. (Cl. 126—110)

This invention relates to a heater, and more particularly to an air heater for use with a stove or the like.

The object of the invention is to provide a heater adapted to be positioned over a heat source or combustion unit so that air passing through the heater will be heated to contain the greatest amount of heat energy.

Another object of the invention is to provide a heater adapted to be positioned near a heat source whereby air passing through the heater will be completely heated before escaping to the portion of the dwelling intended to be supplied with heat.

A further object of the invention is to provide a heater which is extremely simple and inexpensive to manufacture.

Other objects and advantages will be apparent during the course of the following description.

In the accompanying drawings forming a part of this application, and in which like numerals are employed to designate like parts throughout the same:

Figure 1 is a front elevational view of a stove with the air heater provided, and with parts broken away and in section;

Figure 2 is a side elevational view of the stove provided with the air heater, with parts broken away and in section;

Figure 3 is an enlarged sectional view taken on the line 3—3 of Figure 2;

Figure 4 is a vertical sectional view of a modified air heater.

Referring in detail to the drawings, the numeral 10 designates a housing provided with a suitable stack 11 projecting from the top thereof for carrying away gaseous products of combustion. Arranged in the housing 10 is a fuel burner 12 which is supported by the plate 9, there being a manually-operable valve 13 associated therewith for controlling the burner flame, Figure 1.

Arranged in spaced relation about the housing 10 is a casing 14 provided with a plurality of openings 15 for the discharge therethrough of heated air into the dwelling to be heated. Certain of the openings 15 may be provided with movable shutters 16 so that the direction of air therethrough can be regulated as desired.

For heating the air there is provided a horizontally-disposed chamber 17, Figures 1 to 3, fabricated of suitable material and arranged just above the fuel burner 12. The ends of the chamber 17 are open, as at 18, and communicate with the space between the housing 10 and casing 14. The chamber 17 is provided with a baffle 19 which extends from one wall thereof so that air entering the chamber 17 will be divided and pass out both ends thereof.

A conduit 20 has one end connected to the chamber 17 intermediate the ends, and the other end of the conduit 20 terminates exteriorly of the casing 14 and is connected to a suitable blower 21 which is driven by a suitable power source, such as an electric motor 22.

Referring to Figure 4, the chamber 17 of the heater is shown provided with an electric heating coil 23 which is adapted to be connected to a source of electrical energy by the conductor cables or wires 24.

In use, the blower 21 forces air in the direction of the arrows, through the conduit 20 and into the chamber 17 where it is heated by the fuel burner 12 or the electric coil 23. The heated air then passes out of the open ends of the chamber 17 and is discharged through the openings 15 in the casing for use in heating a dwelling.

As many embodiments may be made of this inventive concept, and as many modifications may be made in the embodiment hereinbefore shown and described, it is to be understood that all matter herein is to be interpreted merely as illustrative and not in a limiting sense.

I claim:

In a hot air heater, a casing having top, front, back and side walls, with the top and side walls provided with spaced groups of hot air outlets, a housing within the casing and having top, front, back and side walls spaced from the like walls of the casing, a horizontally disposed cylindrical chamber extending between the side walls of the housing in spaced centered relation with respect to the front and back walls and the top and bottom thereof and having restricted hot air outlets at its ends opening through the latter side walls, an air conduit leading inward of the back walls of the casing and housing and connecting with the chamber at its center, a baffle dividing the interior of the chamber in line with the vertical center of the end of the conduit which is connected to said chamber to direct the incoming air in opposite directions through the chamber, an elongated fluid fuel burner positioned lengthwise beneath the chamber, a flue extending upwardly from the top of the housing and through the top wall of the casing, means for force feeding unheated air into the chamber through the conduit, and other means for supplying a fluid fuel to the burner.

JOSEPH DELBERT HARSH.

REFERENCES CITED

The following references are of record in the file of this patent:

UNITED STATES PATENTS

| Number | Name | Date |
|---|---|---|
| 241,959 | Gard | May 24, 1881 |
| 406,521 | Graves | July 9, 1889 |
| 1,754,952 | Humphrey | Apr. 15, 1930 |
| 2,073,424 | LaFay | Mar. 9, 1937 |
| 2,291,232 | Juby | July 28, 1942 |

FOREIGN PATENTS

| Number | Country | Date |
|---|---|---|
| 141,860 | Great Britain | Apr. 29, 1920 |